United States Patent [19]
Kawakami et al.

[11] Patent Number: 5,736,108
[45] Date of Patent: Apr. 7, 1998

[54] REFRIGERANT UNIT IN HYDROGEN TREATING PLANT

[75] Inventors: Katsuhiko Kawakami; Junichi Takano; Nobuyoshi Sawamura, all of Tokyo, Japan

[73] Assignee: Softard Industries Co., Ltd., Tokyo, Japan

[21] Appl. No.: 621,917

[22] Filed: Mar. 26, 1996

[30] Foreign Application Priority Data

Aug. 4, 1995 [JP] Japan ................................ 7-199774

[51] Int. Cl.$^6$ .................................................. C01B 17/48
[52] U.S. Cl. ........................................ 422/161; 422/178
[58] Field of Search ............................. 422/161, 178; 208/212, 213, 341; 423/560, 242

[56] References Cited

U.S. PATENT DOCUMENTS

| | | | |
|---|---|---|---|
| 3,390,075 | 6/1968 | Harper | 208/341 |
| 3,725,252 | 4/1973 | Maier | 208/213 |
| 3,910,834 | 10/1975 | Anderson | 208/213 |
| 4,012,487 | 3/1977 | Merkl | 423/242 |
| 4,108,969 | 8/1978 | Merkl | 423/560 |
| 5,021,147 | 6/1991 | Van Driesen et al. | 208/152 |
| 5,028,314 | 7/1991 | Goldberger et al. | 422/178 |

*Primary Examiner*—Scott Kastler
*Attorney, Agent, or Firm*—Lowe, Price, LeBlanc & Becker

[57] ABSTRACT

In a hydrogen treating plant which includes a recycle gas line having a reactor for regenerating a hydrogen sulfide by hydrogenating sulfur and an H2S absorber for absorbing the hydrogen sulfide generated in the reactor, and includes the liquid cyclic line circulating liquid for absorbing the hydrogen sulfide in the H2S absorber therein, a refrigerant unit provided in the liquid cyclic line which is lower temperature and lower pressure relative to the recycle gas line.

7 Claims, 4 Drawing Sheets

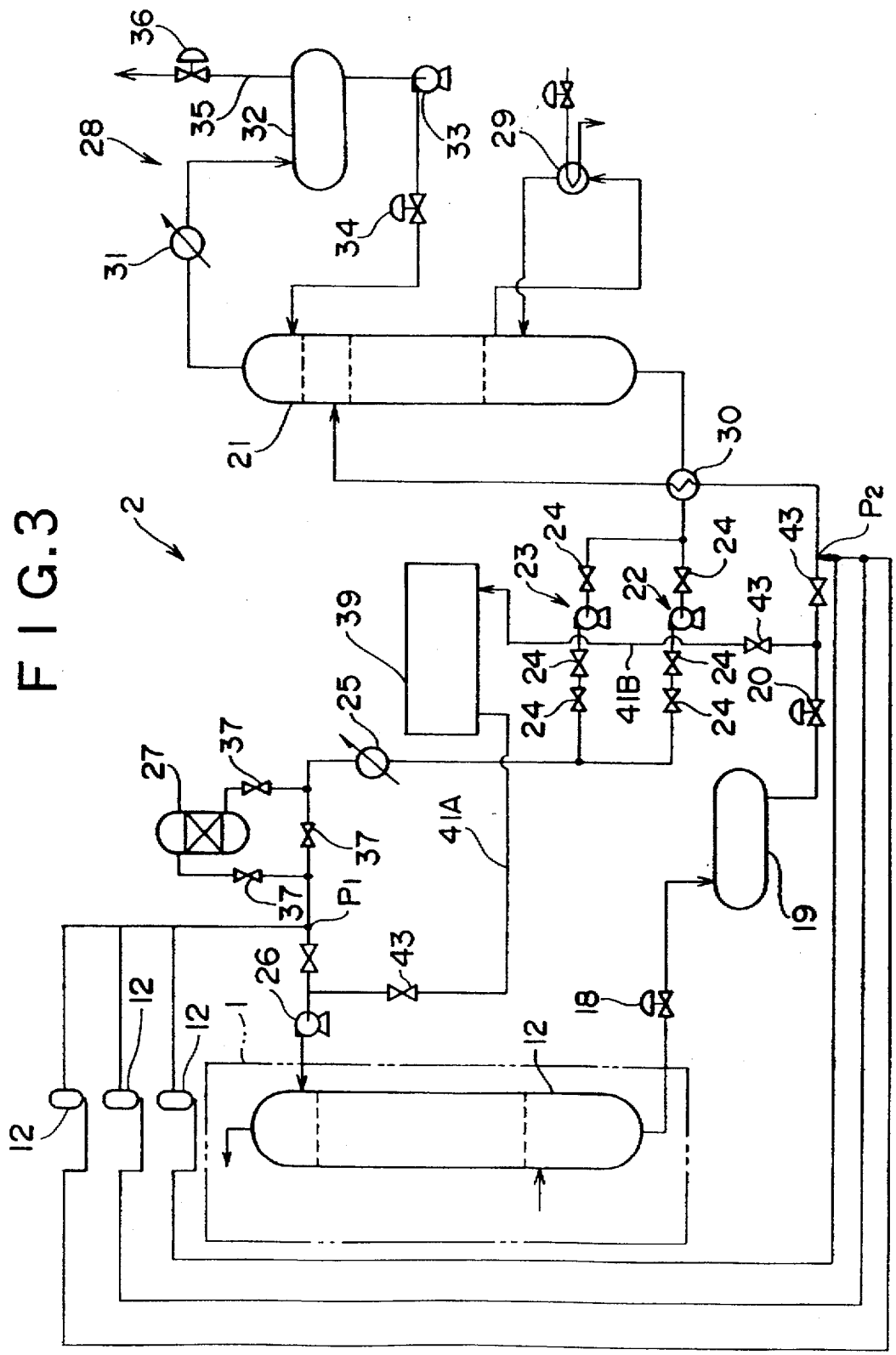
F I G. 3

REFRIGERANT UNIT IN HYDROGEN TREATING PLANT

BACKGROUND OF THE INVENTION

1. FIELD OF THE INVENTION

The present invention relates to a refrigerant unit in a hydrogen treating plant which rapidly cools a reactor composing parts of the plant when terminating the operation of hydrogenating and removing sulfur by the hydrogen treating plant.

2. DESCRIPTION OF THE RELATED ART

A hydrogen treating plant is generally built with a recycle gas line having a reactor Which hydrogenates the sulfur and generates a hydrogen sulfide, an H2S absorber, which absorbs the hydrogen sulfide generated in the reactor, and a liquid cyclic line circulating a liquid absorbing the hydrogen sulfide in the H2S absorber.

It is therefore required for the hydrogen treating plant to rapidly cool the reactor from a temperature range of about 400 to 40 degrees centigrade when terminating the operation to replace the used catalyst.

There is known in the art an air-cooled heat exchanger as one of the conventional refrigerant units used to cool the hydrogen treating plant. The air-cooled heat exchanger is characterized by having a system which is arranged after the reactor and is adapted to remove heat from a recycled gas circulating in a line.

However, use of the conventional apparatus disadvantageously requires three or four days to cool the reactor in the hydrogen treating plant from 400 to 40 degrees centigrade, and furthermore its term for cooling may be hardly, influenced by an outside temperature.

There are some known solutions to this disadvantage, for example, a method in which water is sprayed onto the air-cooled heat exchanger to cool the air-cooled heat exchanger entirely (Improvement 1), a method in which a cooled recycled gas, passed through a by-pass line provided to the heat exchanger arranged in the recycle gas line, is directly fed into the reactor (Improvement 2), a method in which liquid nitrogen is supplied from the top portion of the reactor to decrease the temperature of the recycle gas (Improvement 3), a method in which liquid propane is supplied from the top portion of the reactor to decrease the temperature of the recycled gas (Improvement 4), and a method in which watering the top portion of the furnace is performed to entirely cool the furnace (Improvement 5).

In Improvement 1, some components in the air-cooled heat exchanger such as a motor, bearing and so on will be damaged, so that a shield and a water drop prevention tub for the motor should be provided. Furthermore this cooling procedure naturally requires much water for cooling.

In Improvement 2, the laid by-pass line is always at a high temperature and is under high pressure in the recycle gas line, so that the tubes used are required to be of high quality and have enough thickness to bear the high pressure, whereby the total cost of installation becomes costly. The installation of such a by-pass line is impossible into an existing hydrogen treating plant.

In Improvement 3, a large quantity of liquid nitrogen, of which the per-unit cost is relatively high, may be required to carry out sufficient cooling procedure, which causes an increase in running costs.

In Improvement 4, propane gas is required to be exhausted to a flare by nitrogen after the cooling procedure.

In Improvement 5, since the inside of the furnace is submerged, some start-up time is necessary. It is also necessary to take appropriate measures not to leak water into the burner of the furnace. Furthermore, the total cooling is not effective because the cooling is carried out to the whole furnace. Therefore, much water is required for cooling.

Accordingly, an object of the present invention is to provide a refrigerant unit in a hydrogen treating plant which performs the cooling procedure effectively and is easily installed in an existing hydrogen treating plant.

SUMMARY OF THE INVENTION

Therefore, the present invention is intended to achieve the aforementioned object by in a hydrogen treating plant a refrigerant unit in a liquid cyclic line which circulates liquid for absorbing hydrogen sulfide.

Concretely, according to the present invention, the refrigerant unit for a hydrogen treating plant which includes a recycle gas line having a reactor for regenerating a hydrogen sulfide by hydrogenating sulfur and an H2S absorber for absorbing the hydrogen sulfide generated in the reactor, and includes the liquid cyclic line circulating liquid for absorbing the hydrogen sulfide in the H2S absorber therein, is characterized by being provided in the liquid cyclic line in order to rapidly cool the reactor when the operation of the hydrogen treating plant's is interrupted.

During plant operation, hydrogen is sent into the recycle gas line to hydrogenate sulfur in the reactor provided in the recycle gas line which results in hydrogen sulfide.

The hydrogen sulfide is sent into the H2S absorber. In the H2S absorber, the hydrogen sulfide is absorbed by liquid fed from the liquid cyclic line, and the liquid absorbing the hydrogen sulfide returns to the liquid cyclic line.

The refrigerant unit is operated in order to replace the used catalyst and so on. Whereupon, the liquid circulating in the liquid cyclic line is cooled by the refrigerant unit, and then the circulating liquid is contacted with the recycle gas in the H2S absorber, resulting in the reactor being cooled through the cooled recycle gas.

When the reactor is cooled to a predetermined temperature (e.g., 40° C.), the operation of the plant is interrupted to replace the catalyst used in the plant.

The refrigerant unit is provided in the already-existing liquid cyclic line, but the liquid cyclic line is at a lower temperature and lower pressure than the recycle gas line, whereby, relative to directly providing the refrigerant unit in the recycle gas line, the refrigerant unit is safely provided at a lower cost.

Here, the liquid can define an amine aqueous solution and the refrigerant unit can define as a chilled water unit cooling the amine aqueous solution by using chilled water.

In the case in which the liquid is of the amine aqueous solution and the refrigerant unit is of the chilled water unit cooling the amine aqueous solution by using chilled water, the chilled water unit itself has a higher cooling effect than other cooling means, whereby the cooling efficiency of the plant is further improved. Further, since the refrigerant unit is assembled in the liquid cyclic line as a unit, it becomes easy to provide the refrigerant unit in the liquid cyclic line.

It is advisable that the liquid cyclic line has a main pump and a standby pump which are previously provided therein as low pressure amine aqueous solution pumps circulating the amine aqueous solution, in which the standby pump is connected with the chilled water unit.

In the aforementioned structure, by connecting the quiescent standby pump with the chilled water unit during the operation of the plant, the installation of the chilled water unit is safely carried out at the same time the plant is operating.

The main pump and the standby pump may be provided with pump transfer valves to cause either the main pump or the standby pump to operate.

In this case, the chilled water unit is easily operated by only operating the transfer valve.

The liquid cyclic line can have a high pressure amine aqueous solution pump between the main pump and standby pump and the H2S absorber to cause the amine aqueous solution to circulate.

In the aforementioned structure, the amine aqueous solution can be fed under high pressure to the H2S absorber, whereby the inside of the H2S absorber is rapidly cooled by the large volume of cooled amine aqueous solution.

The standby pump can have a pump and a discharge line provided in the pump to feed out the amine aqueous solution, the discharge line being connected through a connecting pipe with the chilled water unit.

In this case, the amine aqueous solution is forcibly fed to the chilled water unit by the pump of the standby pump.

The discharge line in the standby pump can have a transfer valve switching between a channel which feeds the amine aqueous solution fed from the pump of the standby pump through the chilled water unit to the H2S absorber and a channel which feeds the amine aqueous solution to the H2S absorber bypassing the chilled water unit.

The liquid cyclic line may be connected with more than one of the H2S absorber and the liquid from each tower may join after absorbing the hydrogen sulfide in the H2S absorbers, and therefore the refrigerant unit can be disposed at the side of the H2S absorbers closer than a branch position and a confluent position of each of the H2S absorbers in the liquid cyclic line.

In the aforementioned structure, while several H2S absorbers of a plurality of the H2S absorbers are operating, the reactor can be interrupted and cooled.

The H2S absorbers may be structured in the recycle gas line.

BRIEF DESCRIPTION OF THE DRAWINGS

FIG. 3 is a structural view showing an entire hydrogen treating plant in which a refrigerant unit of a second embodiment according to the present invention is applied.

DETAILED DESCRIPTION OF THE PREFERRED EMBODIMENT(S)

Figure 1:
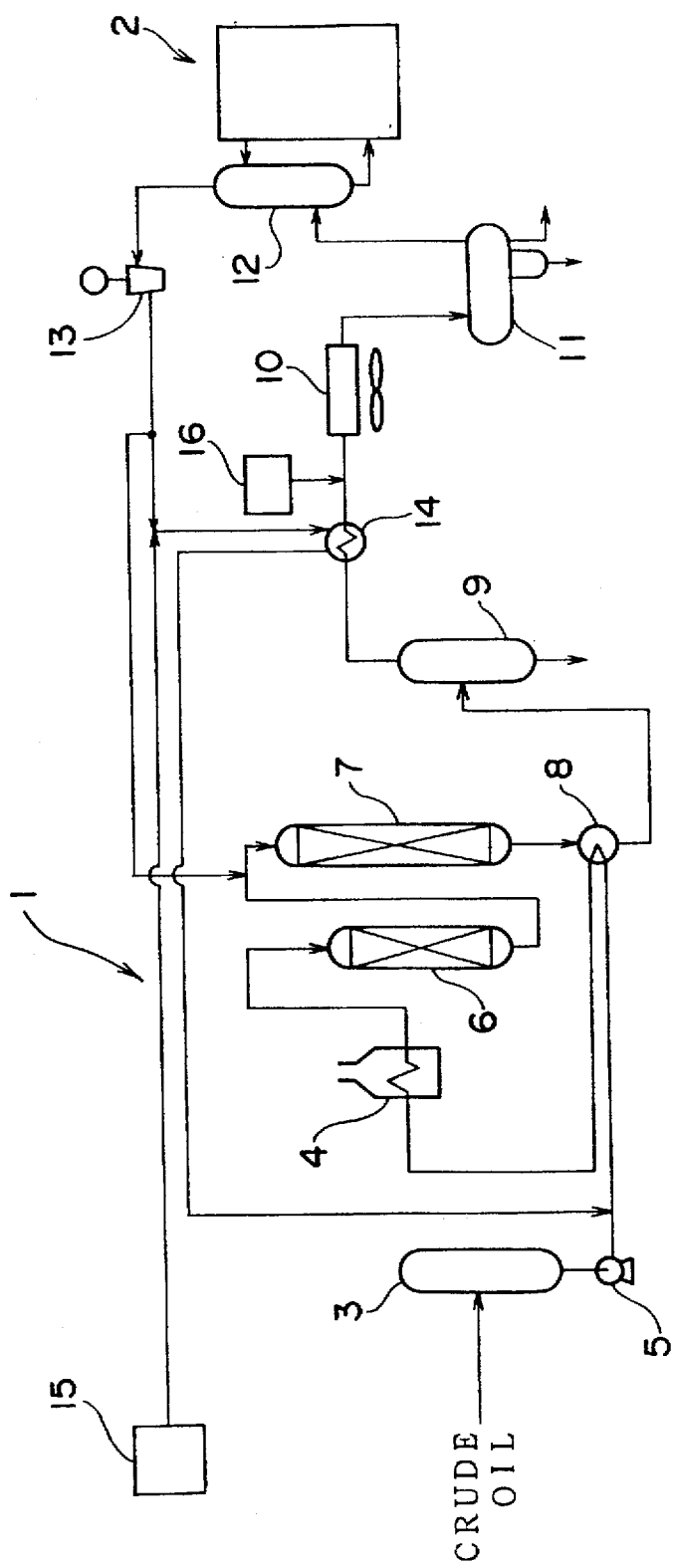
FIG. 1 is a structural view showing an entire hydrogen treating plant in which a refrigerant unit of a first embodiment according to the present invention is applied.

Still other objects and advantages of the present invention will become readily apparent to those skilled in this art from the following detailed description, wherein only the preferred embodiments of the invention are shown and described, simply by way of illustration of the best mode contemplated of carrying out the invention. The invention is capable of other and different embodiments, and several of its details are capable of being modified in various obvious respects, all without departing from the invention. Accordingly, the drawings and descriptions are to be regarded as illustrative in nature, and not as restrictive. The preferred embodiment of the present invention will be described with reference to the drawings. Incidentally, in the description of the following embodiments, the same reference numerals will be used to designate the same or similar components as those in the first embodiment, so that the description may be omitted or simplified.

Figure 2:
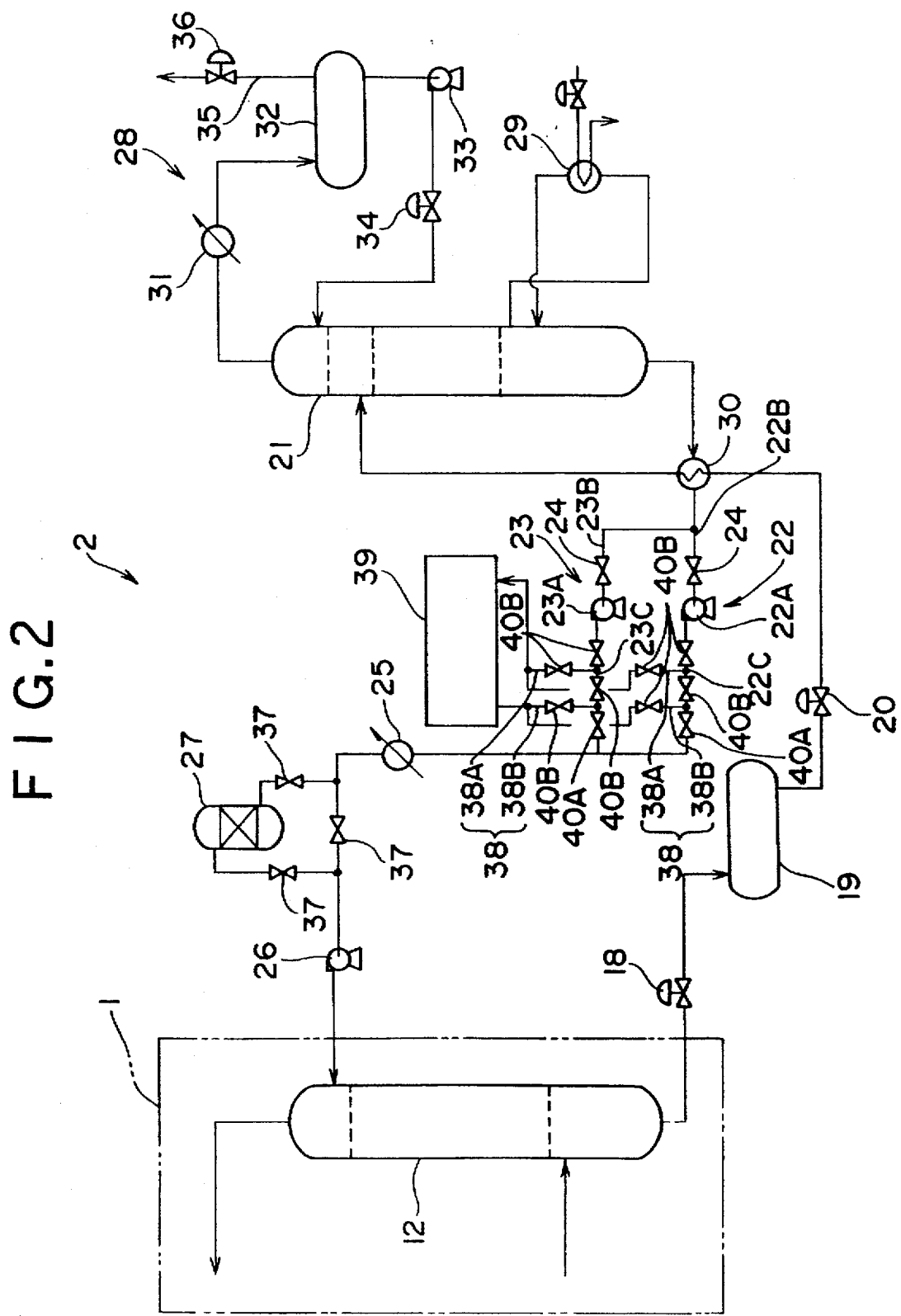
FIG. 2 is a diagrammatic view showing details of a liquid cyclic apparatus in the hydrogen treating plant.

FIGS. 1 and 2 both depict a hydrogen treating plant in which the refrigerant unit in the first embodiment is applied.

The entire structure of the hydrogen treating plant shown in FIG. 1 is that of a hydrogen desulfurization plant which is provided with a recycle gas line 1 and a liquid cyclic line 2.

The recycle gas line 1 is structured with a surge-tank 3 supplied with a crude oil, a heating-furnace 4 for heating the crude oil, a crude oil transfer pump 5 for transferring the crude oil in the surge-tank 3 to the furnace 4, first and second reactors 6, 7 acting upon the sulfur of the crude oil heated by a catalyst in the furnace 4 with hydrogen to generate hydrogen sulfide, a first heat exchanger 8 carrying out a heat exchange action between a fluid sent from the reactors 6, 7 and the crude oil sent to the furnace 4, a high temperature separator 9 in which a fluid fed from the second reactor 7 through the first heat exchanger 8 is separated into oil and gas, an air-cooled heat exchanger 10 to cool the separated gas, a low temperature separator 11 in which the cooled fluid processed in the air-cooled heat exchanger 10 is further separated into oil and gas, an H2S absorber 12 to absorb hydrogen sulfide from the fluid sent from the low temperature separator 11, a compressor 13 transferring the fluid sent from the H2S absorber 12 to hot separator vapor heat exchanger 14 and the second reactor 7, a heat exchanger 14 carrying out a heat exchange between the fluid sent from the compressor 13 to the first heat exchanger 8 and the fluid sent from the high temperature separator 9 to the air-cooled heat exchanger 10, a hydrogen make-up unit 15 supplying the hydrogen to the first reactor 6 through the heat exchangers 14, 8 and the furnace 4, and a water supply apparatus 16 supplying water to clean the sludge in the fluid sent to the air-cooled heat exchanger 10.

The details of the liquid cyclic line 2 are shown in FIG. 2 in which it is adapted to circulate an amine aqueous solution absorbing the hydrogen sulfide in the H2S absorber 12.

As can be seen from FIG. 2, the liquid cyclic line 2 is provided with a degassing drum 19 connected with a bottom portion of the H2S absorber 12 through a valve 18, a regenerator 21 connected to the degassing drum 19 through a valve 20, main pumps 22 and 23 pumping low pressure amine aqueous solution which are respectively connected with the regenerator 21, a pump transfer valve 24 causing one of the main pumps 22 and 23 to operate, a high pressure amine aqueous solution pump 26 of which a suction side is connected with these main pumps 22, 23 through a cooler 25 and of which a discharge side is connected with the H2S absorber 12 at its top portion, an amine aqueous solution filter 27 arranged at an inlet side of the high pressure amine aqueous solution pump 26 and connected with the H2S absorber 12, a regenerator overhead system 28 connected with the regenerator 21, a reboiler 29 heating the amine aqueous solution of the regenerator 21, and a fourth heat exchanger 30 carrying out a heat exchange process between the amine aqueous solution fed from the regenerator 21 to the main pumps 22, 23 and the amine aqueous solution fed from the degassing drum 19 to the regenerator 21.

The regenerator 21 is provided to heat the amine aqueous solution absorbing the hydrogen sulfide and water in a reboiler 29, to separate the hydrogen sulfide from the amine aqueous solution in its bottom portion, and feed the hydrogen sulfide along with the water vapor into the regenerator overhead system 28 and to send the amine aqueous solution in which the hydrogen sulfide is separated to the main pump 22.

The regenerator overhead system 28 is structured with a overhead receiver 32 connected with the regenerator 21 through a condenser 31 arranged in its upper area, a reflux pump 33 transferring the water from the overhead receiver 32 to the regenerator 21, a valve 34 provided between the reflux pump 33 and the regenerator 21, a hydrogen sulfide delivery pipe 35 connected to a top portion of the overhead receiver 32, and a valve 36 provided on the hydrogen sulfide delivery pipe 35.

Around the amine aqueous solution filter 27, there is provided a valve 37 controlling and regulating the flow to the amine aqueous solution filter 27. The aqueous solution fed from the amine aqueous solution filter 27 is pressured by the amine aqueous solution high pressure pump 26 when being sent to the H2S absorber 12.

The standby pump 23 is organized with a pump 23A, a suction line 23B provided thereto with the pump transfer valve 24 to receive the amine aqueous solution, and a discharge line 23C to feed out the amine aqueous solution. The discharge line 23C is connected with the refrigerant unit, in accordance with the first embodiment, through the connecting pipe 38.

The refrigerant unit is a chilled water unit 39 which cools the amine aqueous solution by using chilled water. The chilled water unit 39 has a general structure having tubes in which cold water at a predetermined temperature (e.g., 5 degrees) flows and a refrigerant passes around these tubes. In the first embodiment, the amine aqueous solution is fed from the regenerator 21.

The connecting pipe 38 is composed with a suction pipe 38A to feed the amine aqueous solution fed from the pump 23A of the standby pump 23 to the chilled water unit 39 and with a discharge pipe 38B to feed the amine aqueous solution cooled in the chilled water unit 39 to the H2S absorber 12.

There are transfer valves 40A, 40B provided on the connecting pipe 38 and the discharge line 23C of the standby pump 23 each switching between two channels, one being provided to feed the amine aqueous solution fed from the pump 23A of the standby pump through the chilled water unit 39 to the H2S absorber 12, the other being provided to feed the amine aqueous solution fed from the pump 23A to the H2S absorber 12 bypassing the chilled water unit 39.

The main pump 22, for a low pressure amine aqueous solution, is composed with a pump 22A, a suction line 22B provided with the pump transfer valve 24 to inlet the amine aqueous solution, and a discharge line 22C feeding out the amine aqueous solution, the discharge line 22C being connected with a connecting pipe 38 composed with a suction pipe 38A and a discharge pipe 38B. Incidentally, the discharge line 22C is provided with the transfer valves 40A, 40B.

In the above-explained first embodiment, when running the whole plant, the crude oil is supplied into the surge-tank 3 and thereafter the hydrogen make-up unit 15 begins to operate.

The crude oil in the surge-tank 3 is fed to the furnace 4 through the heat exchanger 8 by means of the crude oil transfer pump 5 and the hydrogen is fed to the furnace 4 through the heat exchangers 14, 8 by the hydrogen make-up unit 15.

The crude oil and hydrogen are heated by the furnace 4 and further fed into the first reactor 6 and the second reactor 7. In these reactors 6, 7, the sulfur component in the crude oil reacts with the hydrogen to thereby generate a hydrogen sulfide.

The high temperature fluid including the hydrogen sulfide and the surplus hydrogen which has not reacted in the reactors 6, 7, is fed through the first heat exchanger 8 to the high temperature separator 9 where it is separated into oil and gas. The separated gas is further cooled in the air-cooled heat exchanger 10 and thereafter sent to the low temperature separator 11 to be further separated into oil and gas.

The fluid is sent from the low temperature separator 11 to the H2S absorber 12 and in this H2S absorber 12 the amine aqueous solution fed from the liquid cyclic line 2 absorbs hydrogen sulfide. The fluid containing the hydrogen sulfide which is not absorbed in the H2S absorber 12 and the hydrogen is sent partially to the furnace 4 through the heat exchangers 14, 8 by the compressor 13 and the rest is sent to the second reactor 7. As mentioned, the hydrogen is recycled in the recycle gas line 1 and the hydrogen make-up unit 15 is adapted to control the preferable hydrogen feed rate.

In the liquid cyclic line 2, the amine aqueous solution processed in the amine aqueous solution filter 27 is sent to the H2S absorber 12 by means of the high pressure amine aqueous solution pump 26. In this H2S absorber 12, the amine aqueous solution absorbs the hydrogen sulfide in the recycle gas line 1 and the amine aqueous solution which absorbs the hydrogen sulfide is sent to the regenerator 21 through the degassing drum 19 and the fourth heat exchanger 30.

In the regenerator 21, the amine aqueous solution is heated by the reboiler 29 to separate the hydrogen sulfide from the amine aqueous solution. The amine aqueous solution, from which the hydrogen sulfide is separated, is fed to the main pump 22 through the fourth heat exchanger 30. The main pump 22 feeds the amine aqueous solution to the H2S absorber 12 through the cooler 25 and the high pressure amine aqueous solution pump 26. But, in this process, the standby pump 23 does not operate. Accordingly, the amine aqueous solution recycles in the liquid cyclic line 2 to thereby remove impurities from the amine aqueous solution and maintain quality by the amine aqueous solution filter 27.

The hydrogen sulfide separated by the regenerator 21 is fed to the regenerator overhead system 28, namely, to the overhead vapor system along with the water vapor. In the overhead vapor system, the hydrogen sulfide and the water vapor are cooled by the condenser 31 and sent to the overhead receiver 32. The water vapor condenses into a water state and is stored in the overhead receiver 32, while the hydrogen sulfide is fed to a unit, not-shown, from inside of the overhead receiver 32 through the hydrogen sulfide delivery pipe 35. The water in the overhead receiver 32 is fed into the regenerator 21 by the reflux pump 33.

For the purpose of shut-down and short-work, it is recommended that a chilled water unit 39 as the refrigerant unit be provided to the liquid cyclic line 2, for example, to be used in a hydrogen treating plant that is in operation.

Accordingly, the transfer valve 40B is attached to the discharge line 23C of the standby pump 23 and the chilled water unit 39 is also attached to a predetermined position on the discharge line 23C through the connecting pipe 38, and further the transfer valve 40B is attached to the connecting pipe 38.

For the operation of the chilled water unit 39, the main pump 22 is terminated by the pump transfer valve 24 in order to operate the standby pump 23. The transfer valve 40B is operated to send the amine aqueous solution into the chilled water unit 39. Accordingly, the amine aqueous solution is sent to the standby pump 23 from the regenerator 21 through the fourth heat exchanger 30 and further sent to the chilled water unit 39 by the same pump 23. The amine aqueous solution cooled by the chilled water unit 39 is fed to the H2S absorber 12 through the cooler 25 and the high pressure amine aqueous solution pump 26.

The cyclic gas is cooled by contacting the amine aqueous solution cooled in the H2S absorber 12 with the cyclic gas. The cooled cyclic gas causes the catalyst in the reactors 6, 7 to cool.

When the reactors 6, 7 are cooled to the predetermined temperature, for example, 40 degrees centigrade, the whole plant is stopped, whereby the catalyst used in this plant is changed. Incidentally, when the chilled water unit 39 is in operation, the low pressure amine aqueous solution pump 22 is stopped, so that the discharge line 22C of the main pump 22 may be provided with a transfer valve 40B and a connecting pipe 38 for the next changing of the catalyst.

According to the first embodiment, (1) in the hydrogen treating plant structured with the recycle gas line 1 having the reactors 6, 7 generating the hydrogen sulfide by hydrogenating the sulfur and the H2S absorber 12 absorbing hydrogen sulfide generated in the reactors 6, 7, and the liquid cyclic line 2 circulating the liquid for absorbing the hydrogen sulfide in the H2S absorber 12, since the refrigerant unit 39 is provided on the liquid cyclic line 2, the cooling efficiency will be improved compared with the conventional apparatus in which the air-cooled heat exchanger was arranged in the recycle gas line, and the liquid cyclic line 2 is maintained at a low temperature and low pressure level compared with the recycle gas line 1, so that installation of the refrigerant unit to the existing liquid cyclic line 2 can be carried out safely and easily compared with the refrigerant unit (chilled water unit) being directly applied to the recycle gas line 1.

(2) In the above-mentioned first embodiment, since the liquid is defined as the amine aqueous solution and the refrigerant unit is defined as the chilled water unit 39 which cools the amine aqueous solution with chilled water, and because of the high cooling efficiency of the chilled water unit 39, the cooling efficiency of the plant can be improved and furthermore, because it is installed as a unit into the liquid cyclic line 2, the installation of the chilled water unit 39 into the liquid cyclic line 2 can be carried out easily.

(3) Furthermore, since the liquid cyclic line 2 has previously been provided with the main pump 22 and the standby pump 23 of the low pressure amine aqueous solution pump, the standby pump 23 being connected with the chilled water unit 39, the installation of the chilled water unit 39 can be carried out safely without any termination of the plant's operations by connecting the chilled water unit 39 with the standby pump 23.

Since the pump transfer valve 24 is disposed for the main pump 22 and the standby pump 23 in order to operate one of the pumps 22 or 23, the chilled water unit 39 is easily operated by only operating the pump transfer valve 24.

Further, by providing the high pressure amine aqueous solution pump 26 which circulates the amine aqueous solution between the main pump 22 and the standby pump 23, and the H2S absorber 12, the amine aqueous solution can be fed under high pressure into the H2S absorber 12, whereby the inside of the H2S absorber 12 is quickly cooled by a great quantity of the cooled amine aqueous solution.

Since the standby pump 23 is organized with the pump 23A and the discharge line 23C provided at the pump 23A to feed out the amine aqueous solution, the discharge line 23C being connected through the connecting pipe 38 with the chilled water unit 39, the amine aqueous solution is force fed into the chilled water unit 39 by the pump 23A of the standby pump 23.

The second embodiment of the present invention will after be explained with reference to FIG. 3. FIG. 3 depicts another hydrogen treating plant to which the refrigerant unit of the second embodiment is applied.

As can be seen from the drawing, in the hydrogen treating plant of the second embodiment, a plurality of (four in FIG. 3) H2S absorbers 12 are connected with the liquid cycle line 2. One of these connected H2S absorbers 12 is accompanied with the aforementioned recycle gas line 1 and all or some other connected H2S absorbers 12 are accompanied with other lines, such as a line for generating fuel-gas or a line for generating LPG.

The branch position P1 and the confluent position P2 of the plural H2S absorbers in the liquid cyclic line 2 are respectively disposed between the high pressure amine aqueous solution pump 26 and the amine aqueous solution filter 27, and between the valve 20 and the fourth heat exchanger 30. At the side of the H2S absorbers 12 of the recycle gas lines 1 closer than the branch position P1 and the confluent position P2, there is provided a chilled water unit 39 as the refrigerant unit.

In other words, one end of the connecting pipe 41A is connected between the high pressure amine aqueous solution pump 26 and the amine aqueous solution filter 27, while one end of the connecting pipe 41B is connected between the valve 20 and the fourth heat exchanger 30. Both of the other ends of the connecting pipes 41A, 41B are connected with the chilled water unit 39.

The connecting pipes 41A, 41B have open-close valves 43 to allow or regulate the flow of the amine aqueous solution from the chilled water unit 39 to the H2S absorber 12.

Incidentally, it should be understood that the chilled water unit 39 is to be connected with each the H2S absorber 12, but in the example in FIG. 3 the chilled water unit 39 is shown connected with only one of the H2S absorbers 12 accompanied with the recycle gas lines 1 and the other remaining connected H2S absorbers 12 are omitted to be depicted.

The process for removing the sulfur generated in the reactors 6, 7 in this second embodiment is the same as those in the first embodiment, and in the liquid cyclic line 2, the amine aqueous solution is sent from the regenerator 21 to each of the H2S absorbers 12. In the H2S absorber 12, the amine aqueous solution absorbs the hydrogen sulfide in the recycle gas line 1 and the amine aqueous solution which has absorbed the hydrogen sulfide is sent to the regenerator 21.

But in the second embodiment, for cooling the predetermined H2S absorber 12, the open-close valve 43 is first operated. Thereafter, the amine aqueous solution stored in the H2S absorber 12 is sent to the chilled water unit 39 through the degassing drum 19 and the valve 20 to be cooled in the chilled water unit 39. The cooled amine aqueous solution is pressurized in the high pressure amine aqueous solution pump 26 and then returned to the H2S absorber 12.

As in the first embodiment, the cooled amine aqueous solution cools the inside of the H2S absorber 12, so that the recycle gas line 1 including the H2S absorber 12 and the reactors 6, 7 can be cooled by suing hydrogen as the recycled gas.

In the other recycle gas lines, the non-cooled amine aqueous solution is sent from the regenerator 21 to each the H2S absorber 12 to remove the remaining sulfur.

Accordingly, in the second embodiment, the same effects as (1) and (2) in the above-mentioned first embodiment can be attained, and the liquid cyclic line 2 is connected with the plural H2S absorbers 12, the amine aqueous solution from each tower join after absorbing the hydrogen sulfide in these H2S absorbers 12 and the chilled water unit 39 is disposed at the side of the H2S absorbers 12 closer than the branch position P1 and the confluent position P2 of each of the H2S absorber in the liquid cyclic line 2, whereby even when some of the recycle gas lines 1 are in operation, one of recycle gas lines 1 can be terminated and cooled.

It is to be understood that the present invention is not intended to be limited to the above-described embodiments, and various changes may be made therein without departing from the spirit of the present invention. Such changes are also included in the scope of the present invention.

For example, the refrigerant unit used in the respective embodiments is the chilled water unit 39, but it can be replaced with a water sprinkling means for sprinkling water over the liquid cyclic line 2.

In the first embodiment, the chilled water unit 39 may be disposed closely to the cooler 25 or along the way of the liquid cyclic line 2.

In the second embodiment, the amine aqueous solution is circulated between the chilled water unit 39 and the H2S absorber 12 but the water used for cleaning in the terminating process of the H2S absorber 12 may be circulated instead of the amine aqueous solution.

In other words, the mentioned terminating process of the H2S absorber 12 has several steps, such as, pressure relaxing, discharging of the amine aqueous solution, displacing with nitrogen, washing and releasing and the water used in the washing step is circulated between the chilled water unit 39 and the H2S absorber 12.

Figure 4:
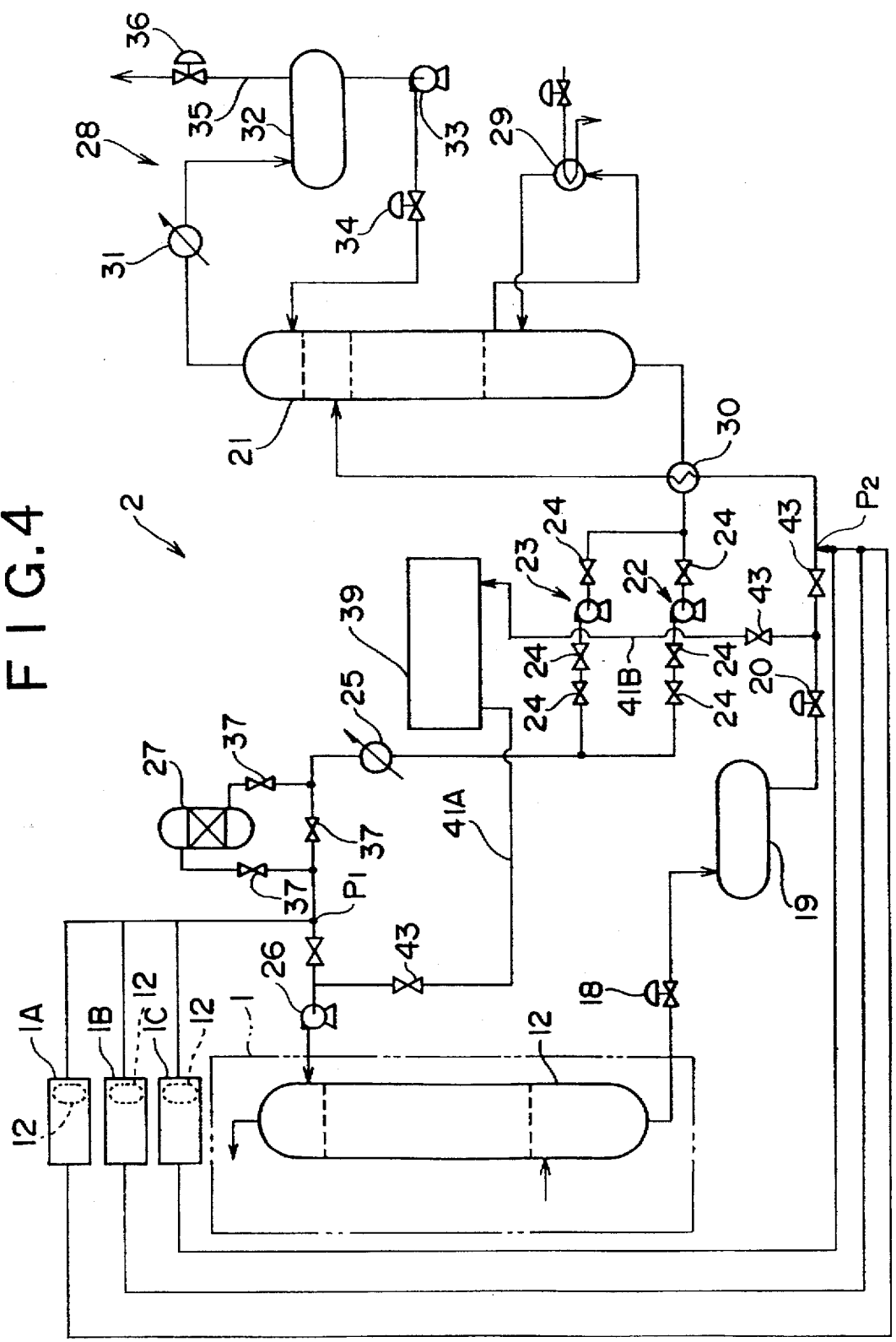
FIG. 4 is a structural view showing an entire hydrogen treating plant in which a modification of a refrigerant unit according to the present invention is applied.

In the second embodiment, the hydrogenate unit is structured for other kinds of lines including the H2S absorbers 12 as a line for generating fuel gas, a line for generating LPG or the like, but in the present invention, all the plural hydrogenate units can be structured for the recycle gas lines 1, 1A, 1B, and 1C as shown in FIG. 4.

In FIG. 4, a plurality (four in FIG. 4) of the recycle gas lines 1, 1A, 1B and 1C of the hydrogenate unit are connected with the liquid cyclic line 2. The recycle gas lines 1A, 1B and 1C have the same structure as the recycle gas line 1. In FIG. 4, the recycle gas lines 1A, 1B and 1C are illustrated with only the H2S absorbers 12 and the other structures of the recycle gas lines are omitted to be depicted.

Furthermore, the hydrogen treating plant is defined as a hydrogenate desulfurization plant in the aforementioned embodiments, however, in the present invention, the hydrogen treating plant can be defined as a hydro-cracking type plant or a hydrogenate decomposition plant.

According to the present invention, in the hydrogen treating plant including the recycle gas line having the reactor in which the hydrogen sulfide is generated by hydrogenating sulfur and the H2S absorber in which the hydrogen sulfide generated in the reactor is absorbed, and including the liquid cyclic line in which liquid for absorbing the hydrogen sulfide in the H2S absorber is circulated, the refrigerant unit is facilitated to be provided in the liquid cyclic line, whereby the cooling efficiency is obtained more than with the conventional refrigerant unit using an air-cooled heat exchanger, furthermore, the liquid cyclic line is a lower temperature and lower pressure than the recycle gas line, whereby, relative to the case of directly provide the refrigerant unit in the recycle gas line, the refrigerant unit can be much more safely and simply provided in the already-existing liquid cyclic line.

What is claimed is:

1. In a hydrogen treating plant which includes a recycle gas line having a reactor for regenerating a hydrogen sulfide by hydrogenating sulfur and an H2S absorber for absorbing the hydrogen sulfide generated in the reactor, and a liquid cyclic line circulating an amine aqueous solution for absorbing the hydrogen sulfide in said H2S absorber therein, the improvement comprising a refrigerant unit which is provided in the liquid cyclic line in order to rapidly cool the reactor when the operation of said hydrogen treating plant is interrupted, wherein said refrigerant unit is a chilled water unit cooling the amine aqueous solution by using chilled water, and wherein said liquid cyclic line includes a main pump and a standby pump which are provided to operate as low pressure amine aqueous solution pumps circulating the amine aqueous solution, said standby pump being connected with said chilled water unit.

2. In the hydrogen treating plant according to claim 1, wherein said main pump and said standby pump include pump transfer valves to cause one of said main pump and said standby pump to operate.

3. In the hydrogen treating plant according to claim 1, wherein said liquid cyclic line has a high pressure amine aqueous solution pump between said main pump and standby pump and said H2S absorber which circulates the amine aqueous solution.

4. In the hydrogen treating plant according to claim 1, wherein said standby pump has a pump and a discharge line provided in said pump to feed out the amine aqueous solution, said discharge line being connected through a connecting pipe with said chilled water unit.

5. In the hydrogen treating plant according to claim 4, wherein said discharge line in said standby pump has a transfer valve switching between a channel which feeds the amine aqueous solution fed from the pump of said standby pump through said chilled water unit to said H2S absorber and a channel which feeds the amine aqueous solution to said H2S absorber bypassing said chilled water unit.

6. In the hydrogen treating plant according to claim 1,
   wherein said liquid cyclic line is connected with a plurality of H2S absorbers and the liquid from each H2S absorber is collected after absorption of the hydrogen sulfide in said H2S absorbers; and
   wherein said refrigerant unit is disposed at a side of said H2S absorbers closer than a branch position and a confluent position of each said H2S absorber in said liquid cyclic line.

7. In the hydrogen treating plant according to claim 6, wherein said H2S absorbers are situated in said recycle gas line.

* * * * *